Oct. 24, 1967    I. F. BARNWELL    3,348,391
STEERING WHEEL LOCK FOR AUTOMOBILES
Filed March 1, 1966
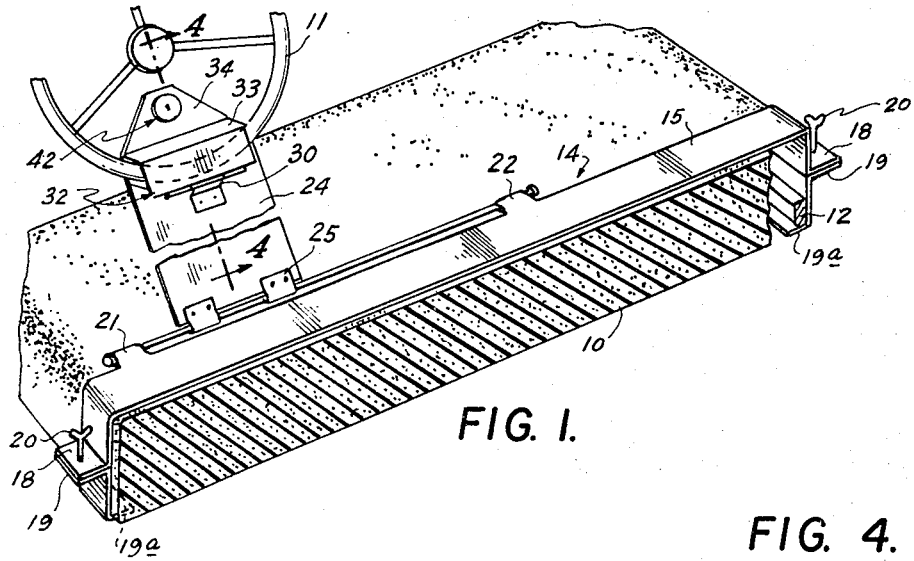
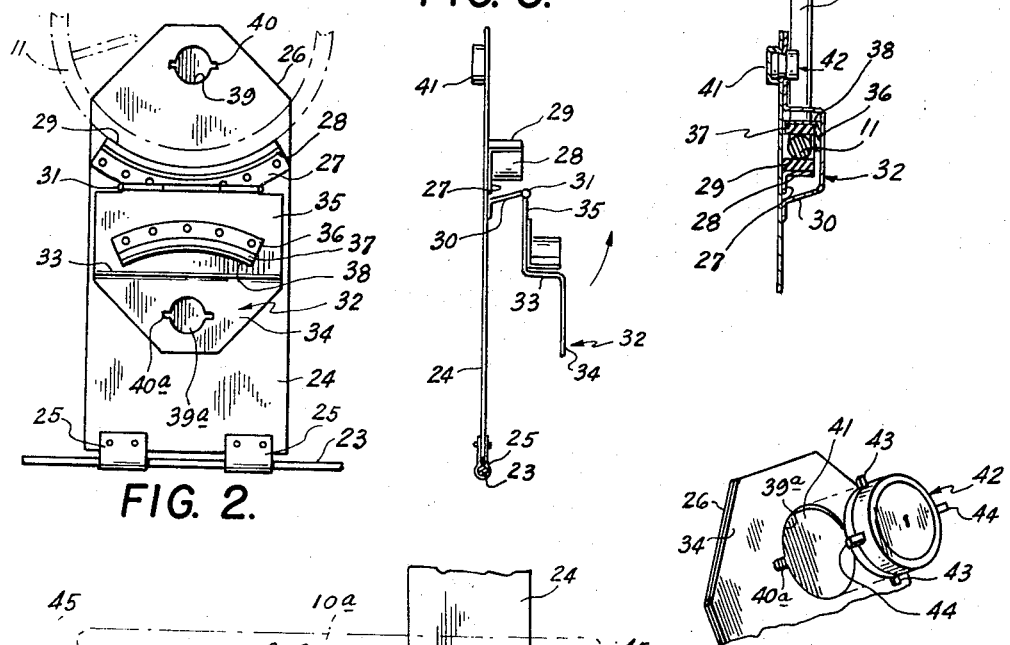
INVENTOR.
IRVING F. BARNWELL
BY 
ATTORNEY

United States Patent Office 3,348,391
Patented Oct. 24, 1967

3,348,391
STEERING WHEEL LOCK FOR AUTOMOBILES
Irving F. Barnwell, 150—42 115th Drive,
Jamaica, N.Y. 11434
Filed Mar. 1, 1966, Ser. No. 530,990
6 Claims. (Cl. 70—211)

This invention relates to anti-theft devices for automobiles, and more particularly to such a device as to be applied to the steering wheel of the vehicle.

An object of the invention is the provision of a novel and improved device for locking the steering wheel to prevent turning the same through more than a minimal arc and thereby limiting motion of the vehicle to practically a straight ahead direction so that it may not be steered around a corner or even on to or off from a roadway. Thus, a vehicle equipped with the instant device could not be driven away even though the engine could be started.

The above broad as well as more specific objects are clarified in the following description wherein reference numerals refer to like-numbered parts in the accompanying drawing. It is to be noted that the drawing is intended primarily for the purpose of illustration and that therefore it is neither desired nor intended to limit the invention necessarily to any or all of the exact details shown or described except insofar as they may be deemed essential to the invention.

Referring briefly to the drawing, FIG. 1 is a perspective view, with parts broken away and partly in section, illustrating a preferred embodiment of the invention, wherein the locking device is shown locked on the steering wheel of an automobile.

FIG. 2 is a fragmentary enlargement of FIG. 1, showing the slidable locking device in open or unlocked condition.

FIG. 3 is a side view of FIG. 2, showing the guide rod in section.

FIG. 4 is a fragmentary sectional view taken on the line 4—4 of FIG. 1.

FIG. 5 is an exploded fragmentary perspective view showing how a common type of gasoline nozzle lock is used in conjunction with the device.

FIG. 6 is a fragmentary elevational view, with parts broken away and partly in section, showing a modified form of the support for the locking device as applied to a vehicle having a removable seat cushion.

Referring in detail to the drawing, the numeral 10 designates the front seat cushion of an automobile whose steering wheel is shown at 11. The cushion 10 has the usual supporting framework of which only a portion is shown at 12. A support or base 14 is provided for adjustable securement of the locking device, described below, to the seat. This base comprises an elongated flat plate or band 15 which rests on the cushion and is positioned adjacent the rear edge thereof. At its ends the band is deformed to provide upper clamp jaws 18, and lower complementary clamp jaws are provided at 19, the latter having inturned extremities 19a to engage the underside of the frame 12. Thus, with the aid of a screw 20, each end of the band is clamped to the seat.

Extending from the band 15 are two rolled tabs 21 and 22, the former being positioned near the left-hand end of the band and the latter being positioned to the right of the mid-portion of the band. Although the tabs are shown at the forward edge of the band, they may instead be positioned at the rear edge thereof or even between the forward and the rear edge. The tabs extend a short distance upward from the top surface of the band, and the ends of a guide rod 23 are fixed therein, as by means of heads 13. Thus the rod is spaced a short distance above the band. A plate 24 has two hinge ears 25 on its lower edge, through which the rod 23 passes, whence the plate 24 is slidably mounted on the rod.

Spaced from its upper tapering end 26, the plate 24 has secured thereto a bracket 27 having an arcuate shelf 28 covered with a lining 29 which may be a fiber or a material such as that of which brake linings are made. Secured to the plate 24 directly below the bracket 27, is a second outwardly extending bracket 30 to the outer edge of which by means of a pin 31 an approximately Z-shaped plate 32 is hinged. Approximately intermediate its length the plate 32 has a portion 33 lying approximately at right angles to the end portions 34, 35 thereof. Secured to the portion 35 is a bracket 36 having an arcuate shelf 37 provided with a similar lining of fiber or the like 38. The plate 32 is adapted to be swung upward in the direction of the arow, FIG. 3, into the position thereof shown in FIG. 4. The curvature of the arcuate shelves 28 and 37, the distance the bracket 30 extends outward from the plate 24, and the position of the bracket 36 on the plate portion 35, are all such that, when the plate 32 is in the position shown in FIG. 4, an arcuate space is provided between the linings 29 and 38 which is complementary to the curvature of the steering wheel 11. It is thus aparent that the steering wheel may be clamped between the two plates 24 and 32.

Near the upper end 26 of the plate 24 a circular hole 39 is provided, having opposed notches extending therefrom, as at 40. A similar and complementary hole 39a with notches 40a is cut out of the portion 34 of the plate 32. Behind the hole 39 in the plate 24 a socket 41 is provided in alignment with the hole 39. A standard type of gasoline tank inlet lock is shown at 42, FIG. 5, having opposed retractable lugs 43 and, spaced a quadrant therefrom, opposed solid ridges 44 on the cylindrical housing thereof. With the device clamped about the steering wheel as shown in FIGS. 1 and 4, the lock 42 is partway inserted into the socket 41 while the lugs are retracted by a key, not shown, and with the ridges 44 registering in the notches 40a as well as the notches 39a therebehind. Upon release and extraction of the key the lugs 43 are extended and thus clamp the combined plate portions 34, 26 between the lugs and the lock housing, thus securing the said two portions together about the wheel. The plate portion 34 is also tapered to be complementary to the portion 26 when the two are brought together, as in FIGS. 1 and 4.

Assuming that the device has been used in the locking position shown in FIG. 1, when the owner enters the car he uses his key to open the lock 42 and then swings the plate 32 clockwise, FIG. 1, into the position thereof shown in FIG. 3, whence the plate 24 is released from the wheel 11 and is free to be lowered. He then slides the device along the rod 23 to a position approximately intermediate the width of the front seat and finally swings it clockwise so that it rests or leans against the back, or back rest, of the seat, in an obvious manner.

The modified form shown in FIG. 6 is applicable to vehicles in which the seat cushion is removable and rests in a well whose floor is shown at 16. Here upstanding grips 45 are provided at the ends of the band 15a to fit over the side portions of the wall 17 which defines the well, while the band rests on the floor 16 and the cushion 10a covers the band. Clamps 46, substituted for the clamps 18, 19, serve the same purpose as before. The rolled tabs 21a and 22a extend upward from the front edge of the band a distance sufficient to elevate the rod 23a above the front portion of the wall 17. When the locking device 24, 32 of the modified form is not in use, it is tilted downward, not shown, to rest on the floor in front of the seat.

Preferably all parts of the device, except for the linings 29 and 38, are made of sheet steel which is extremely resistant to hacking through. When the steering wheel is thus locked as set forth, it is impossible for a prospective thief to turn the vehicle sufficiently to make a getaway, as is readily apparent.

What is claimed is as follows:

1. In an automotive vehicle, a device for locking the steering wheel consisting of an elongated support extending transversely of the vehicle and having a first means for securing the same to the front seat of the vehicle, a locking device consisting of a plate, a second means hingedly and slidably connecting one end of said plate to said support for slidable movement of the plate longitudinally with respect to the support, said plate having a length sufficient to extend from said support to a position beyond an adjacent portion of said wheel to position the other end of the plate against the underside of said wheel portion, said plate having near but spaced from said other end thereof a first arcuate jaw of the same radius of curvature as the convex side of said wheel registrable against the convex side of said wheel portion, said plate having hinged thereto on an axis below said first jaw a second arcuate jaw complementary to said first jaw having the same radius of curvature as the concave side of said wheel whereby when said plate is positioned as aforesaid said second jaw is swung upward into engagement with the concave side of said wheel portion said wheel portion is confined between said jaws, and a third means for releasably locking said jaws against separation from said wheel portion.

2. A device according to claim 1, said support comprising a flat band having the opposed ends thereof positioned substantially at the transversely opposed edges of said front seat.

3. A device according to claim 2, said first means comprising clamps on said opposed ends of the band engaging said opposed edges of said front seat.

4. A device according to claim 2, said second means comprising spaced tabs extending from a longitudinal edge of said band having a rod supported in the extremities thereof, and hinge ears on said one end of said plate slidably mounted on said rod.

5. A device according to claim 2, said third means comprising an extension on said second jaw engageable with the portion of said plate at said other end thereof, said extension and said portion of the plate having aligned openings therein, and a releasable locking member insertable in said aligned openings.

6. A device according to claim 4, said tabs being so positioned longitudinally of said band that said plate, after unlocking and separating said jaws, may be slid along said rod to a position substantially at the midpoint of said longitudinal edge of the band and then swung about said rod to a position of rest.

References Cited

UNITED STATES PATENTS

| 1,170,987 | 2/1916 | Mudd | 70—211 |
| 1,361,264 | 12/1920 | Kaercher | 70—212 |

MARVIN A. CHAMPION, *Primary Examiner.*

ROBERT L. WOLFE, *Assistant Examiner.*